(12) United States Patent
Herrington et al.

(10) Patent No.: US 10,742,881 B1
(45) Date of Patent: Aug. 11, 2020

(54) COMBINED TEMPORAL CONTRAST SENSING AND LINE SCANNING

(71) Applicant: APPLE INC., Cupertino, CA (US)

(72) Inventors: Andrew Herrington, San Francisco, CA (US); Matthew A Helms, Dublin, CA (US)

(73) Assignee: APPLE INC., Cupertino, CA (US)

( * ) Notice: Subject to any disclaimer, the term of this patent is extended or adjusted under 35 U.S.C. 154(b) by 99 days.

(21) Appl. No.: 16/045,770

(22) Filed: Jul. 26, 2018

Related U.S. Application Data

(60) Provisional application No. 62/563,781, filed on Sep. 27, 2017.

(51) Int. Cl.
*H04N 5/232* (2006.01)
*H04N 13/106* (2018.01)
*H04N 13/254* (2018.01)
*H04N 5/225* (2006.01)

(52) U.S. Cl.
CPC ....... *H04N 5/23238* (2013.01); *H04N 5/2253* (2013.01); *H04N 13/106* (2018.05); *H04N 13/254* (2018.05)

(58) Field of Classification Search
CPC ............. H04N 5/23238; H04N 5/2253; H04N 13/106; H04N 13/254
USPC .......................................................... 348/37
See application file for complete search history.

(56) References Cited

U.S. PATENT DOCUMENTS

| 5,870,220 | A | 2/1999 | Migdal et al. |
| 2017/0026633 | A1* | 1/2017 | Riza ..................... H04N 5/2254 |
| 2017/0223337 | A1 | 8/2017 | Sung et al. |
| 2018/0081062 | A1 | 3/2018 | Oggier et al. |

FOREIGN PATENT DOCUMENTS

| DE | 102015226015 A1 | 6/2017 |
| WO | 2016131036 A1 | 8/2016 |

OTHER PUBLICATIONS

Lichsteiner et al., "A 128 x 128 120 dB 15 μs Latency Asynchronous Temporal Contrast Vision Sensor", IEEE Journal of Solid-State Circuits, vol. 43, No. 2, pp. 566-576, Feb. 2008.
Belbachir et al., "A Novel HDR Depth Camera for Real-time 3D 360° Panoramic Vision", 2014 IEEE Conference on Computer Vision and Pattern Recognition Workshops, pp. 425-432, year 2014.
Matsuda et al., "MC3D: Motion Contrast 3D Scanning", IEEE International Conference on Computational Photography (ICCP), 10 pages, Apr. 24-26, 2015.

* cited by examiner

*Primary Examiner* — Patricia I Young
(74) *Attorney, Agent, or Firm* — Kligler & Associates Patent Attorneys Ltd

(57) ABSTRACT

An optoelectronic device includes a mount, which is configured to rotate about a rotational axis. A line radiation source is attached to the mount and configured to project a line of radiation onto a scene surrounding the mount as the mount rotates. An imaging assembly is attached to the mount in a location that is offset from the radiation source and includes a temporal contrast sensor including a two-dimensional array of sensing elements, which independently and asynchronously generate event signals in response to temporal changes of irradiance, and objective optics, which are configured to image the scene onto the array.

15 Claims, 8 Drawing Sheets

COMBINED TEMPORAL CONTRAST SENSING AND LINE SCANNING

CROSS-REFERENCE TO RELATED APPLICATION

This application claims the benefit of U.S. Provisional Patent Application 62/563,781, filed Sep. 27, 2017, which is incorporated herein by reference.

FIELD OF THE INVENTION

The present invention relates generally to optoelectronic devices, and particularly to optoelectronic devices used for three-dimensional mapping and imaging of scenes.

BACKGROUND

Temporal contrast sensors (some examples of which are sometimes referred to as Dynamic Vision Sensors) are a class of sensor arrays whose sensing elements respond asynchronously to relative changes in incident intensity, i.e., changes in irradiance, also referred to as temporal contrast. The sensor output is an asynchronous stream of pixel address-events that directly encode temporal brightness changes in the scene that is imaged onto the array, thus reducing data redundancy while preserving precise timing information. Sensors of this sort are described, for example, by Lichsteiner et al., in "A 128×128 120 dB 15 μs Latency Asynchronous Temporal Contrast Vision Sensor," IEEE Journal of Solid-State Circuits 43:2 (2008), pages 566-576.

Depth sensors enable the remote measurement of distance to each point on a target scene—so-called target scene depth—by illuminating the target scene with one or more optical beams and analyzing the reflected optical signal.

SUMMARY

Embodiments of the present invention that are described hereinbelow provide systems and methods for panoramic three-dimensional mapping.

There is therefore provided, in accordance with an embodiment of the invention, an optoelectronic device, including a mount, which is configured to rotate about a rotational axis. A line radiation source is attached to the mount and configured to project a line of radiation onto a scene surrounding the mount as the mount rotates. An imaging assembly is attached to the mount in a location that is offset from the radiation source and includes a temporal contrast sensor including a two-dimensional array of sensing elements, which independently and asynchronously generate event signals in response to temporal changes of irradiance, and objective optics, which are configured to image the scene onto the array.

In some embodiments, the optoelectronic device includes a processor, which is configured to process the event signals generated by the temporal contrast sensor in response to the line of radiation reflected from the scene as the mount rotates so as to construct a three-dimensional map of the scene. In one embodiment, the radiation source is temporally modulated at a predetermined frequency, and the processor is configured to extract the event signals that are synchronized with the predetermined frequency, and to construct the three-dimensional map based on the synchronized event signals. Additionally or alternatively, the processor is configured to construct the three-dimensional map of the scene using triangulation based on the offset between the radiation source and the imaging assembly.

Further additionally or alternatively, the processor is configured to process the event signals generated by the temporal contrast sensor in response to the rotation of the mount so as to construct a two-dimensional image of the scene and to possibly register the three-dimensional map of the scene with the two-dimensional image of the scene.

In some embodiments, the optoelectronic device includes a flood radiation source, which is configured to illuminate at least a part of the scene that is in a field of view of the imaging assembly as the mount rotates. In a disclosed embodiment, the line and flood radiation sources are configured to emit radiation at a predetermined wavelength, and the imaging assembly includes a spectral bandpass filter configured to pass the radiation at the predetermined wavelength into the imaging assembly. In one embodiment, the flood radiation source is attached to rotate with the mount. In an alternative embodiment, the flood radiation source includes at least one spatially fixed radiation source, which is configured to illuminate a portion of the scene when the field of view of the imaging assembly coincides with the portion of the scene illuminated by the radiation source.

In a disclosed embodiment, the projected line of radiation is parallel to the rotational axis.

There is also provided, in accordance with an embodiment of the invention, a method for three-dimensional mapping, which includes rotating a line radiation source about a rotational axis while projecting a line of radiation from the line radiation source onto a scene surrounding the rotational axis. The scene is imaged onto a temporal contrast sensor, including a two-dimensional array of sensing elements, which independently and asynchronously generate event signals in response to temporal changes of irradiance, while rotating the temporal contrast sensor about the rotational axis in with the temporal contrast sensor offset from the line radiation source. The event signals generated by the rotating temporal contrast sensor in response to the line of radiation reflected from the scene are processed so as to construct a three-dimensional map of the scene.

The present invention will be more fully understood from the following detailed description of the embodiments thereof, taken together with the drawings in which:

DETAILED DESCRIPTION OF EMBODIMENTS

Embodiments of the present invention that are described herein take advantage of the unique capabilities of temporal contrast sensors to map in real time a three-dimensional image of a scene. Specifically, these embodiments use a two-dimensional temporal contrast sensor together with a radiation source that projects a line of radiation onto the scene, which rotate together about an axis. An image of the scene is formed on the temporal contrast sensor, and the position of the image of the projected line, reflected from the scene, on the sensing elements of the temporal contrast sensor is used to calculate the scene depth by triangulation as the projected line of radiation sweeps across the scene.

The disclosed embodiments provide an optoelectronic device, comprising a mount, which rotates about a rotational axis. A radiation source, which is attached to the mount, projects a line of radiation onto a scene surrounding the mount as the mount rotates. The line may conveniently be parallel to the rotational axis, as shown in the figures below; but alternatively, any suitable line may be projected as long as it is not perpendicular to the rotational axis and extends across a sufficient range of elevation angles to illuminate a desired portion of the field of view of the device. (In fact, the line need not even be a straight line.) An imaging assembly is also attached to the mount in a location offset from the radiation source. The imaging assembly comprises a temporal contrast sensor comprising a two-dimensional array of sensing elements and objective optics, which image the scene onto the array as the mount rotates. A processor processes the event signals generated by the temporal contrast sensor in response to the line of radiation reflected from the scene so as to construct a three-dimensional map of the scene.

In some embodiments, detection of the reflected line of radiation can be enhanced by modulating the radiation source at a predetermined frequency. The processor is then able to extract the specific event signals that are synchronized with this frequency, and thus to construct the three-dimensional map based on the synchronized event signals. This synchronous detection approach achieves a high signal/noise ratio, since spurious event signals are easily rejected.

In some embodiments, the processor processes additional event signals generated by the temporal contrast sensor as the mount rotates so as to supplement and enhance the processing of the three-dimensional map. The event signals that are used for this purpose are not due to the line of radiation, but rather to the edges in the scene as a whole as they are imaged by the temporal contrast sensor, and may be enhanced by flood illumination of the scene. The processor can easily register the three-dimensional map of the scene with these additional events, since the same temporal contrast sensor captures all of the events. This integrated approach is advantageous particularly since the edge information provided by the additional events can be used to fill in gaps and areas of uncertainty in the three-dimensional map. In some embodiments, the processor uses the additional event signals in constructing a two-dimensional image of the scene, which is thus registered inherently with the three-dimensional map.

Figure 1:
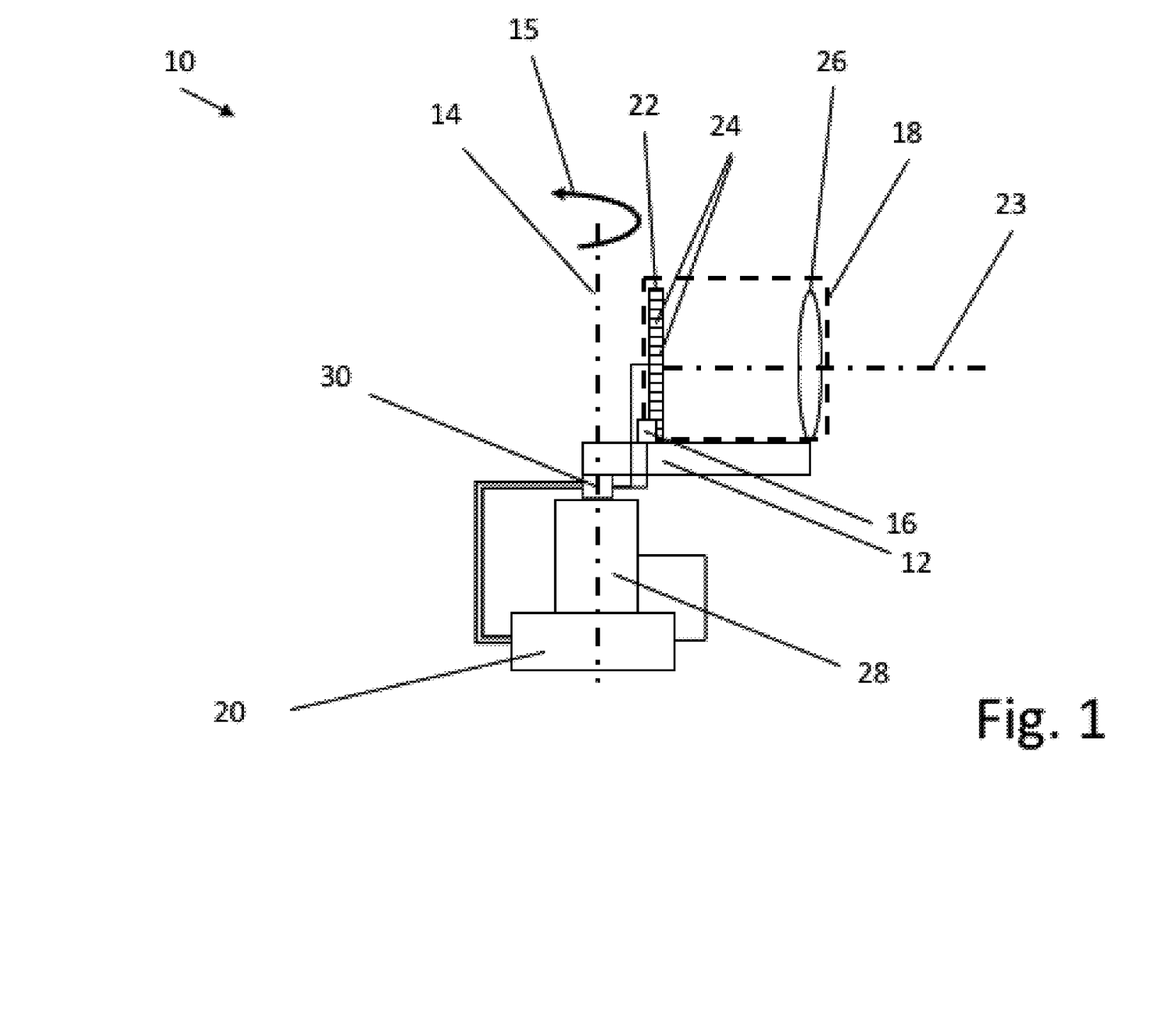
FIG. 1 is a schematic side view of a panoramic imager, in accordance with an embodiment of the invention.

FIG. 1 is a schematic side view of a panoramic imager 10, in accordance with an embodiment of the invention. Panoramic imager 10 comprises a mount 12, which is rotated by a motor 28 about a rotational axis 14 as indicated by an arrow 15. A line radiation source 16 and an imaging assembly 18 are attached to rotate with mount 12. A processor 20 drives line radiation source 16 and receives signals from imaging assembly 18, as described below. The processor may also rotate with mount 12, or it may alternatively be stationary, with suitable coupling to the rotating elements.

Figure 4:
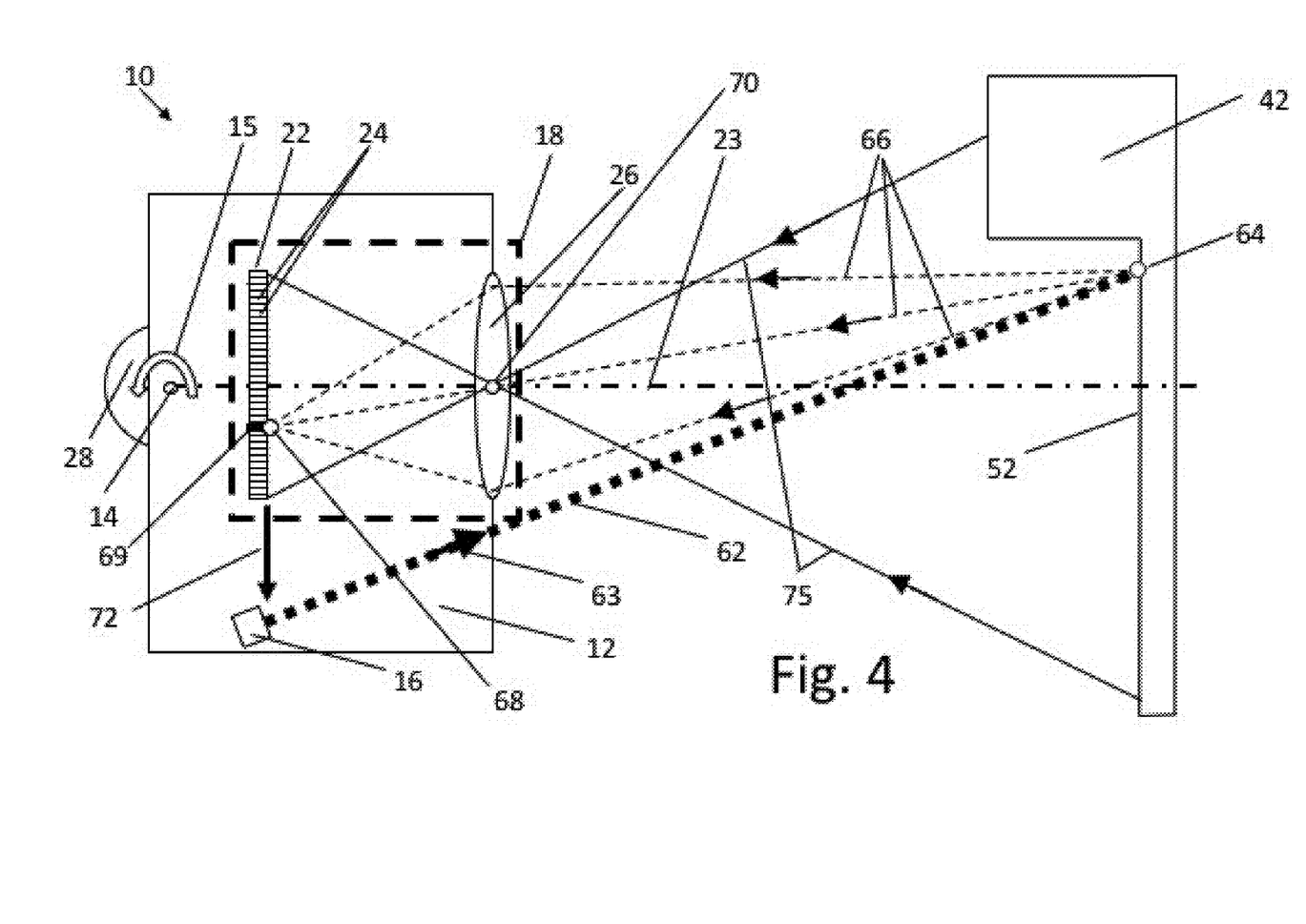
FIGS. 4-5 are schematic top views of a panoramic imager in different rotational positions, in accordance with an embodiment of the invention.

Line radiation source 16 projects onto a scene a line of radiation (shown in FIG. 2), which in the present embodiment is parallel to rotational axis 14. Imaging assembly 18 is attached to mount 12 in a location that is laterally offset from line radiation source 16 (the offset is shown in FIG. 4). The imaging assembly comprises a temporal contrast sensor 22, comprising a two-dimensional array of sensing elements 24, which independently and asynchronously generate event signals in response to temporal changes of irradiance. Objective optics 26 (e.g., one or more lens elements) in imaging assembly 18 image the scene onto sensor 22.

Processor 20 typically comprises one or more programmable processors, which are programmed in software and/or firmware to carry out the functions that are described herein. Additionally or alternatively, at least some of the functions of processor 20 may be carried out by hardware logic circuits, which may be hard-wired or programmable. Thus, although processor 20 is shown and described herein, for the sake of simplicity, as a single functional block, in practice the various functions of processor 20 may be carried out by two or more different physical components. In any case, processor 20 has suitable interfaces for receiving data and transmitting instructions to other elements of the system as described. Thus, for example, processor 20 can be coupled to drive line radiation source 16 and to control the rotation of motor 28 and to receive the event signals generated by temporal contrast sensor 22. Assuming processor 20 to be stationary, a slip ring 30 is attached to mount 12 and conveys electrical signals between processor 20 and the components attached to mount 12 (such as temporal contrast sensor 22 and line radiation source 16).

Processor 20 utilizes the event signals generated in response to the image of the line of radiation that is projected by line radiation source 16 and reflected back from the scene to construct a three-dimensional map of the scene. Processor 20 can, in some embodiments, further utilize the event signals generated by the reflection of ambient or other unstructured illumination from the scene so as to construct a two-dimensional image of the scene, for example an edge image or, alternatively or additionally, a gray-scale image.

In alternative embodiments, mount 12 may be rotated by other means, which are not necessarily integral with imager 10 as in the pictured embodiment. Furthermore, processor 20 may be attached to mount 12, and the components attached to the mount may be powered, for example, by a battery attached to the mount, and communicate images over a wireless link, thus obviating the use of slip ring 30. Still furthermore, the mechanical design of mount 12 and the attached components is shown for the sake of clarity only, and other designs may be considered.

Figure 2:
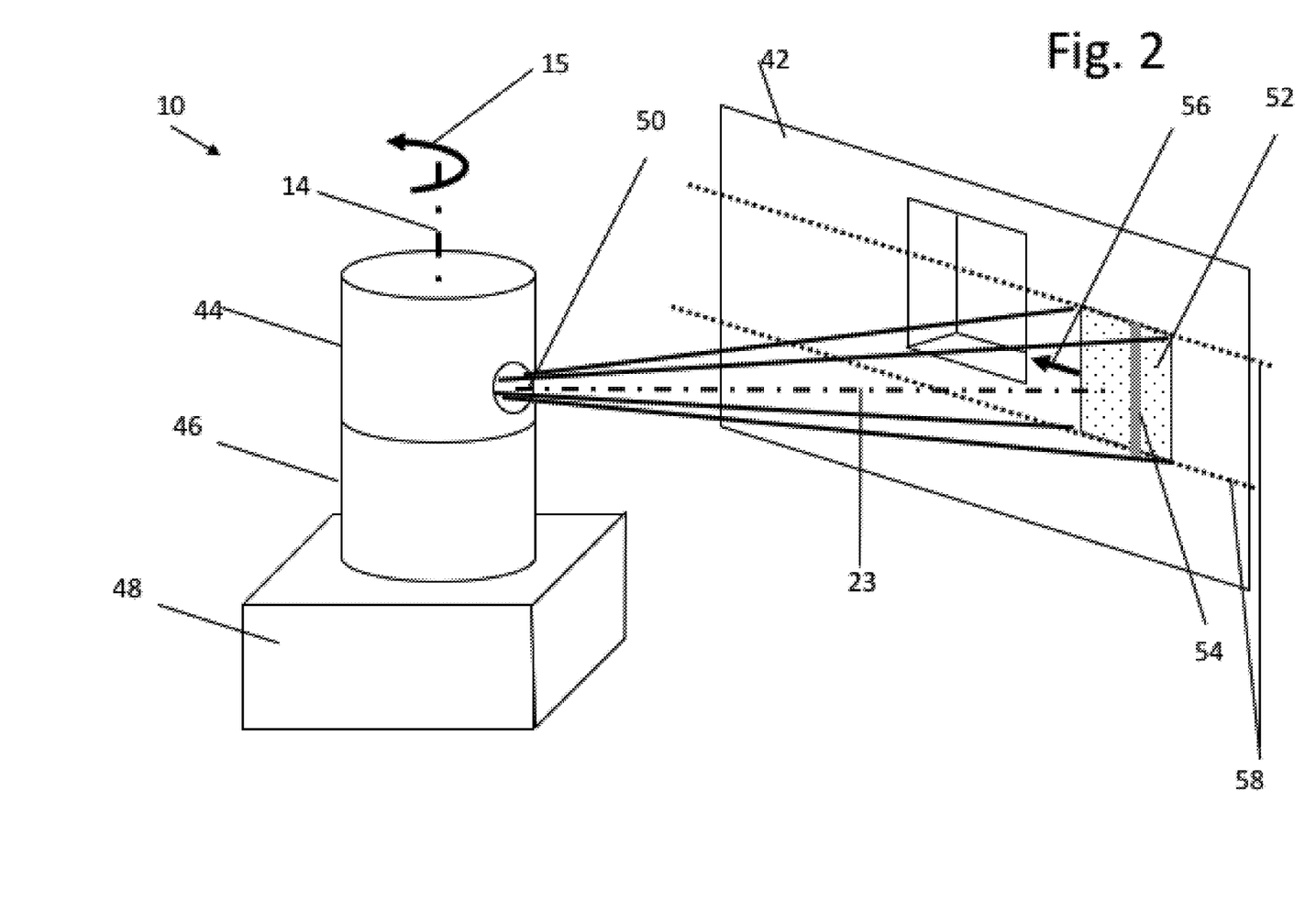
FIG. 2 is a schematic pictorial view of a panoramic imager in operation, in accordance with an embodiment of the invention.

FIG. 2 is a schematic pictorial view of panoramic imager 10 and a scene 42, with covers 44, 46, and 48 added to the panoramic imager, in accordance with an embodiment of the invention. (The scene in this example is shown, for the sake of illustration, as a wall with a window in it, but the principles of this embodiment may similarly be applied to any suitable scene.) Cover 44 encloses mount 12, as well as the components attached to the mount, and rotates together with the mount. An opening 50 is provided in cover 44 as an exit for radiation emitted by line radiation source 16 and for the field of view of imaging assembly 18. (Opening 50 may not actually be physically open, but may rather comprise a window that is transparent to the wavelength range of interest. Cover 46 encloses motor 28, while cover 48 contains processor 20.

The general physical structure of imager 10, including covers 44, 46 and 48, is shown here solely for purposes of illustration, and other physical configurations will be apparent to those skilled in the art after reading the present description and are considered to be within the scope of the present invention. For example, imager 10 may include a larger or smaller number of cover components, including possible only a single cover. One of the covers may move along with the sensor, or the covers may be stationary (in which case opening 50 may have the form of a circumferential window in the cover). Alternatively, imager 10 may be incorporated as a module inside another device, which may in turn have one or more external covers or housings through which the module emits and receives radiation.

A field of view 52 of imaging assembly 18 is covers an area of scene 42, while a line of radiation 54 is projected onto this area by line radiation source 16. Due to the rotation of imaging assembly 18 about axis 14, both field of view 52 and line of radiation 54 sweep across scene 42, as indicated by an arrow 56 and lines 58. (Lines 58 are actual arcs, which form circles around axis 14.) In this way, panoramic imager 10 sweeps over scene 42, covering a horizontal angle of 360° during one full rotation of mount 12.

In FIG. 2, line of radiation 54 is shown as a straight, vertical line, because scene 42 is vertical and planar at the current location of the line of radiation. In general, however, in parts of scene 42 that are inclined and/or non-planar, the image of line of radiation 54 that is captured by imaging assembly 18 will not be a straight, vertical line, but rather will be inclined and/or broken due to parallax. Processor 20 uses these parallax effects in triangulating the depth coordinates of the locations in scene 42 that are traversed by line of radiation 54.

Figure 3:
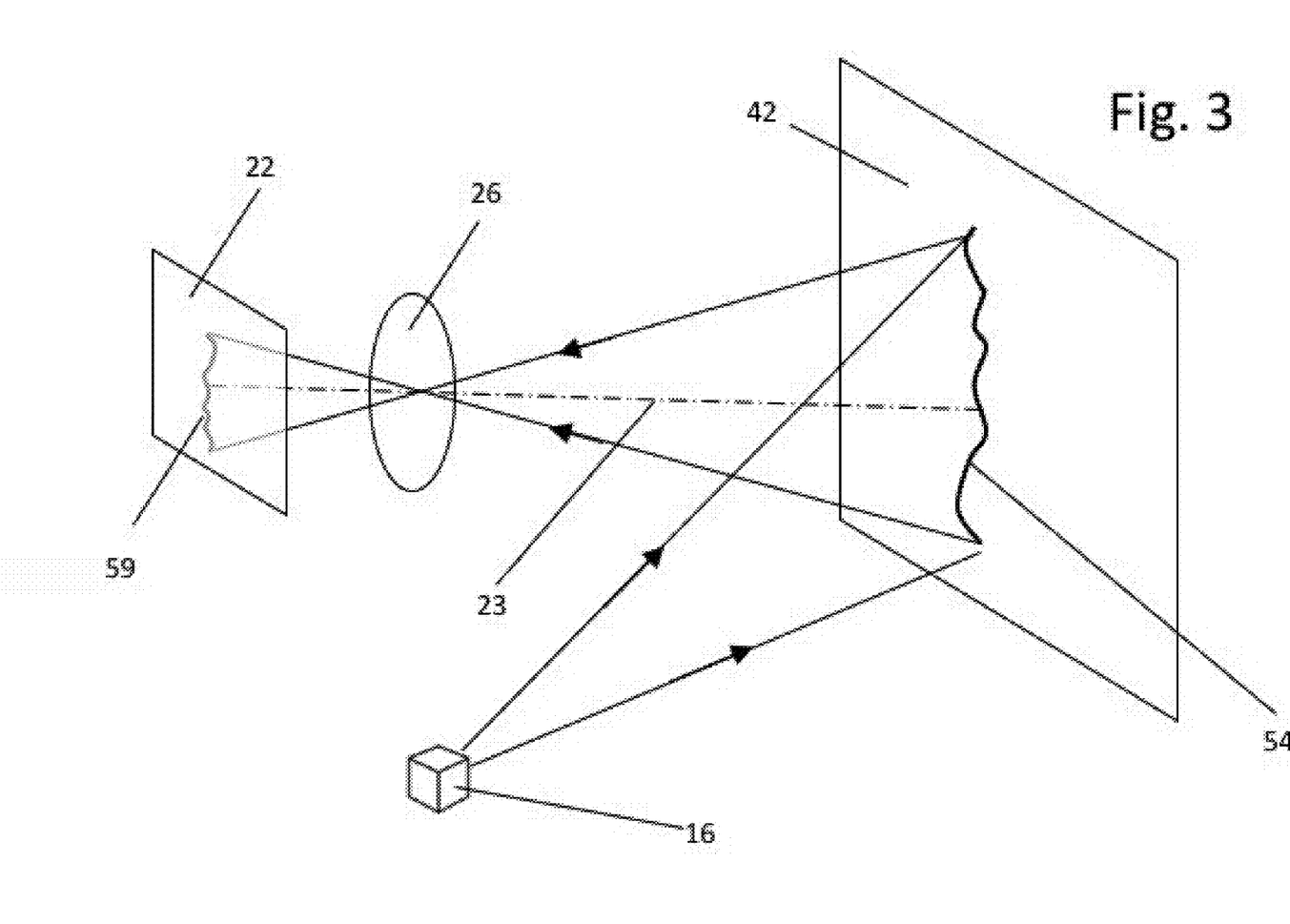
FIG. 3 is a schematic pictorial view of a line of radiation and its image, in accordance with an embodiment of the invention.

FIG. 3 is a schematic pictorial view of line of radiation 54 and its image 59, in accordance with an embodiment of the invention. As in FIG. 2, line radiation source 16 projects line of radiation 54 onto scene 42. Objective optics 26 form an image 59 of line of radiation 54 on temporal contrast sensor 22. In the pictured embodiment, the topography of scene 42 is not planar, and line of radiation 54 does not appear in the image formed on temporal contrast sensor 22 as a straight line, but rather an irregular line reflecting the non-planar topography of scene 42 and the optical effect of parallax.

Figure 5:
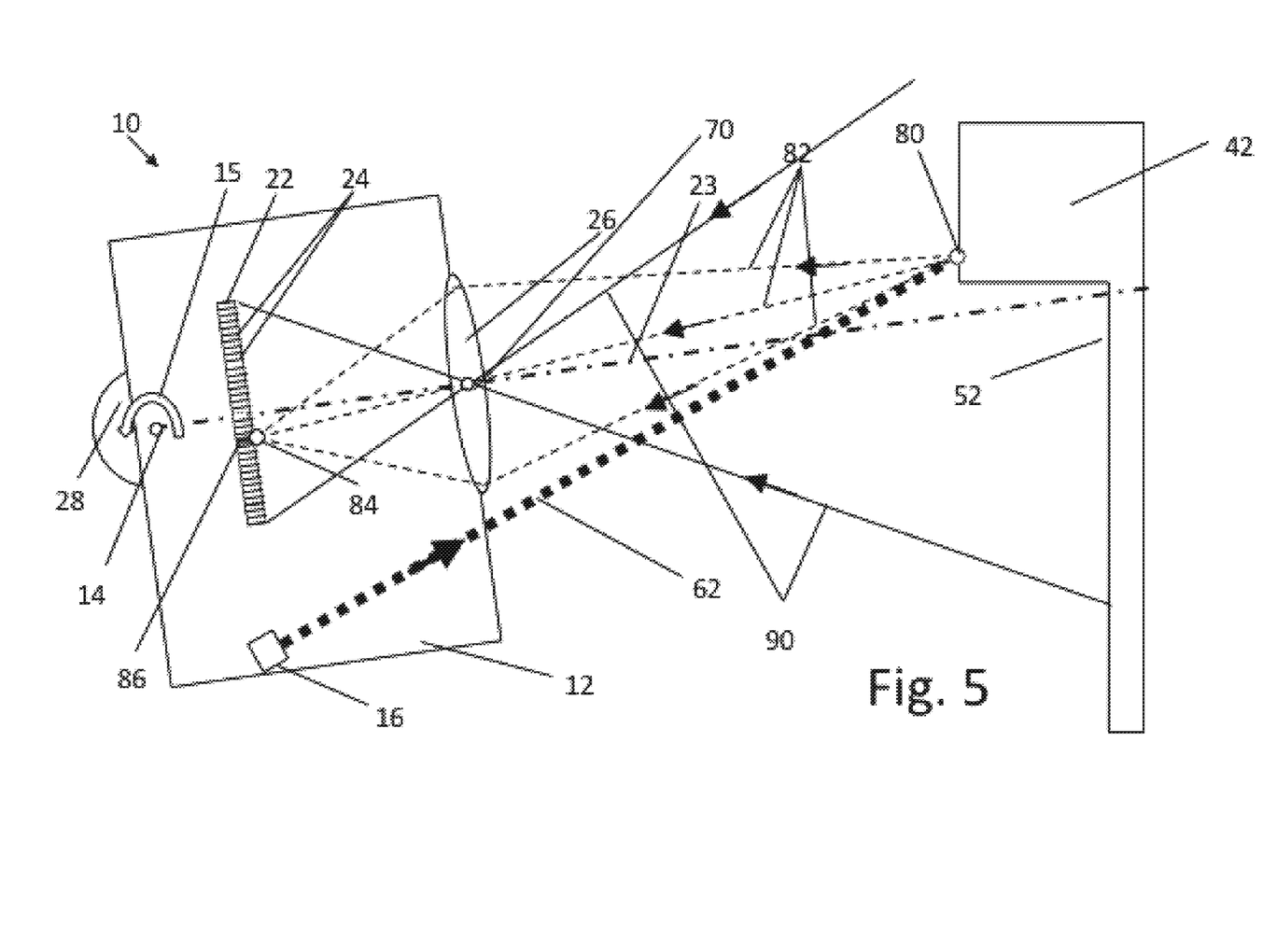

FIGS. 4-5 are schematic top views of panoramic imager 10 in two different rotational positions, as the field of view of the panoramic imager scans across scene 42, in accordance with an embodiment of the invention. Components identical to those of FIG. 1 are indicated with the same labels as used in that figure.

In FIG. 4, line radiation source 16 projects line of radiation 54 along a direction 62 as indicated by an arrow 63, with the orientation of the line of radiation perpendicular to the plane of the figure. The projection of line of radiation 54 onto scene 42 in the plane of FIG. 4 is indicated by a point 64. Rays 66 reflected from point 64 are imaged by objective optics 26 onto a point 68 on temporal contrast sensor 22, causing corresponding event signals to be emitted by a sensing element 69 as line of radiation 54 traverses point 64. A center 70 of objective optics 26 is marked to assist in the tracing of rays 66.

In the pictured embodiment, line radiation source 16 emits DC radiation (constant intensity in time). As sensing elements 24 generate event signals in response to temporal changes of irradiance, the sensing elements in the vicinity of image 59 (represented in the plane of FIG. 4 by point 68) generate event signals when either the image shifts across the sensing elements due to a change in the distance to scene 42 or due to change in scene reflectance as mount 12 rotates.

In an alternative embodiment, the radiation projected by line radiation source 16 is modulated in time at a predetermined frequency, for instance pulsed at a frequency of 100Hz. Consequently, both line of radiation 54 and its image 59 are modulated at the same predetermined frequency, and temporal contrast sensor 22 will output event signals from sensing elements 24 within image 59 that are synchronized with the pulse frequency. Processor 20 is then able to extract the specific event signals that are synchronized with this frequency, for example using a temporal signature or filter that is matched to the modulation frequency, and thus to construct the three-dimensional map based on the synchronized event signals. This synchronous detection approach achieves a high signal/noise ratio, since spurious event signals are easily rejected, and the depth-related events due to image 59 are generated over all areas of the scene, include flat areas, independently of depth variations.

Line radiation source 16 is offset from temporal contrast sensor 22 by a known displacement in a direction perpendicular to line of radiation 54 that is projected by line radiation source 16, as indicated by an arrow 72 in FIG. 4. For this reason, the position of point 68 on temporal contrast sensor 22 varies, due to parallax, with the distance between imaging assembly 18 and scene 42. The distance between imaging assembly 18 and each point in scene 42 may thus be calculated by triangulation from the known offset and position of point 68 at which sensing element 69 has emitted event signals. (In addition, there may be known relationship between the direction of emission of radiation source 16 and the orientation of sensor 22. For example, radiation source 16 may be positioned at different points along the line indicated by arrow 63 and will still give rise to similar parallax to that described here.)

As noted earlier, when scene 42 is not planar, image 59 of line of radiation 54 on temporal contrast sensor 22 may not be a straight line. The depth of scene 42 along line of radiation 54 is calculated separately for each point of image 59. In this manner, processor 20 is able to construct a depth map of the entire scene surrounding imager 10, over 360° of azimuth and a range of elevations determined by the height of field of view 52 of the imager.

In addition to receiving image 59 from line of radiation 54, temporal contrast sensor 22 receives radiation reflected from field of view 52 on scene 42, which is indicated by rays 75. As field of view 52 sweeps over scene 42, temporal contrast sensor 22 generates event signals from edges in the scene. Processor 20 can use these event signals in constructing a two-dimensional edge image of the scene, and possible a gray-scale image, as well.

FIG. 5 shows panoramic imager 10 rotated counterclockwise from its orientation in FIG. 4. Due to the rotation of panoramic imager 10, line of radiation 54 now illuminates scene 42 at a different location, with a point 80 showing the intercept of the line of radiation with the plane of FIG. 5. Rays 82 show how point 80 is imaged onto a point 84 on temporal contrast sensor 22. As the distance from imaging assembly 18 to point 80 is different from that to point 64 in FIG. 4, image 59 is shifted on temporal contrast sensor 22. Consequently, point 84 is shifted relative to point 68 in FIG. 4 (in the spatial framework of temporal contrast sensor 22), and a different sensing element 86 emits a signal in response to line of radiation 54. The distance from imaging assembly 18 to scene 42 in the current position of rotation may again be calculated by triangulation.

Using triangulation as described above, processor 20 constructs a three-dimensional map of the 360° field based on the event signals associated with line of radiation 54.

Processor 20 can easily register the three-dimensional map of scene 42 with the sort of two-dimensional image mentioned above, since the same temporal contrast sensor 22 is used to construct both the map and the image simultaneously. This integrated approach is advantageous particularly since the edge information in the two-dimensional image can be used to fill in gaps and areas of uncertainty in the three-dimensional map.

Figure 6:
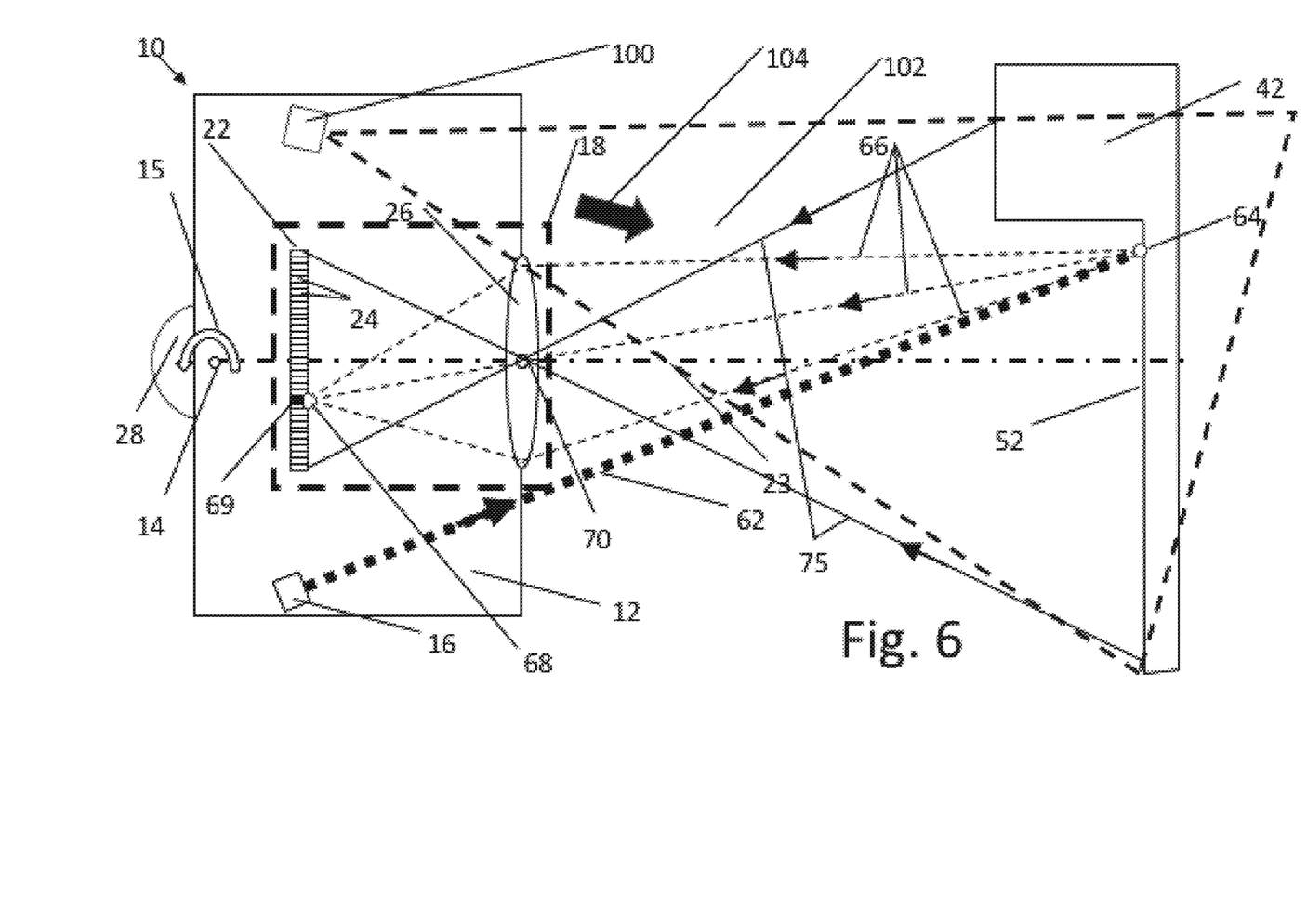
FIG. 6 is a schematic top view of a panoramic imager, in accordance with another embodiment of the invention.

FIG. 6 is a schematic top view of panoramic imager 10 with the addition of a flood radiation source 100, in accordance with an embodiment of the invention. Flood radiation source 100 is attached to mount 12. Except for the addition of flood radiation source 100 and extending mount 12 to accommodate the source, the embodiment of FIG. 6 is identical to that of FIG. 4, and components identical to those of FIG. 4 are indicated with the same labels as used in that figure.

Flood radiation source 100 projects flood radiation 102, as indicated by an arrow 104, onto scene 42 at least within field of view 52 over the expected range of distances between imaging assembly 18 and the scene. Consequently, temporal contrast sensor 22 also receives reflected flood radiation from scene 42, in addition to the reflected ambient illumination. This enables processor 20 to receive event signals and, if desired, to construct a two-dimensional image even under a very low level of ambient illumination. Flood radiation source 100 may be active at all times during operation of imager 10, or it may alternatively be activated selectively, for example when the output of sensor 22 indicates that the level of ambient radiation is low.

Figure 7:
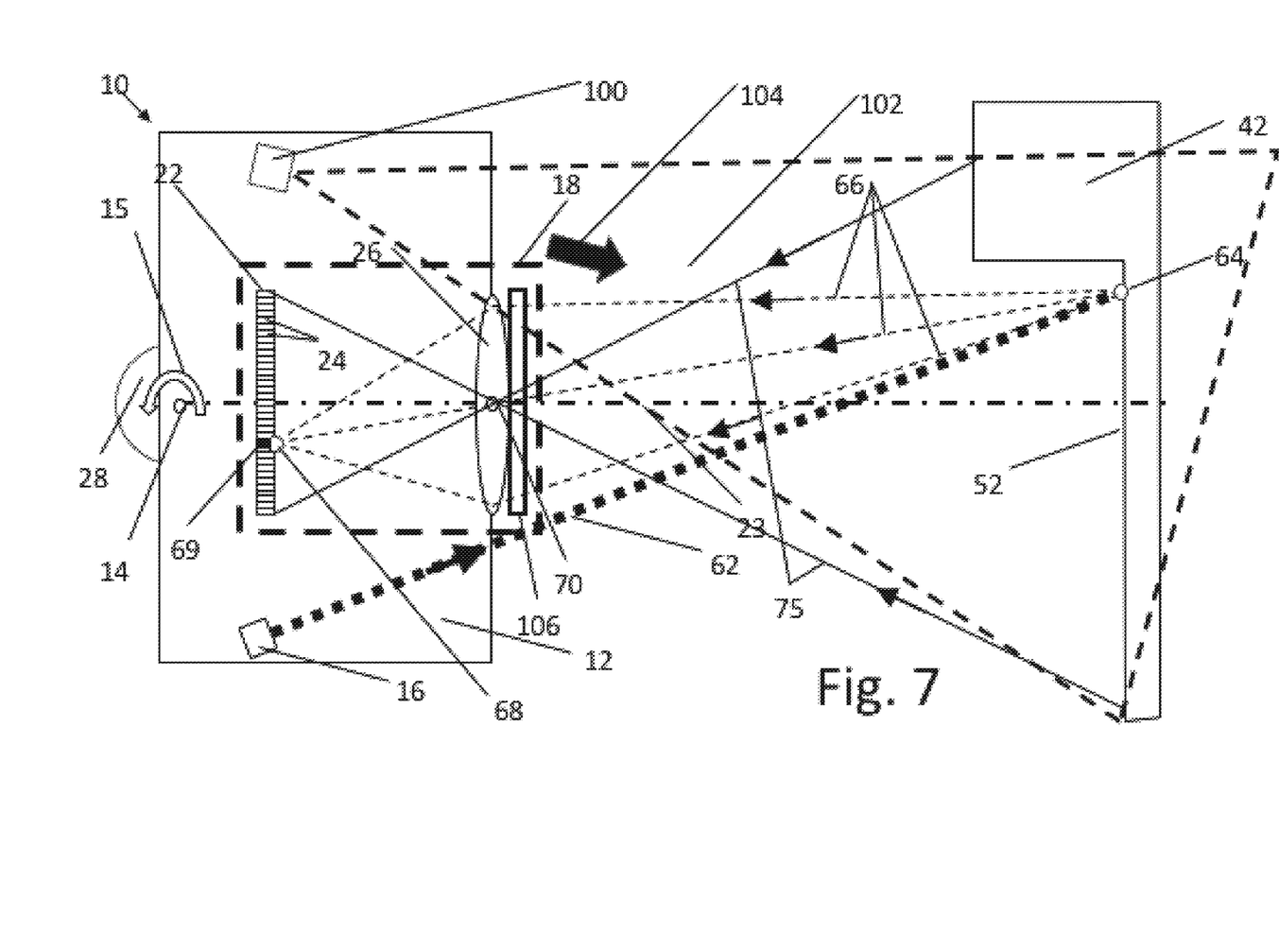
FIG. 7 is a schematic top view of a panoramic imager, in accordance with yet another embodiment of the invention.

FIG. 7 is a schematic top view of panoramic imager 10, with flood radiation source 100 and the addition of a narrow-band transmission filter 106 to imaging assembly 18, in accordance with an embodiment of the invention. Except for the addition of narrow-band transmission filter 106, FIG. 7 is identical to FIG. 6, and components identical to those of FIG. 6 are indicated with the same labels as used in that figure. In the embodiment of FIG. 7, line radiation source 16 and flood radiation source 100 emit radiation at a common wavelength or in the same wavelength range, for example, around 940 nm. Narrow-band transmission filter 106, which is positioned adjacent to objective optics 26, has a pass-band covering at least this same range. In these embodiments it may be desirable to tailor the pass-band of the filter closely to the wavelength or wavelengths emitted by the line radiation source and flood radiation source (or the line radiation source in embodiments that do not include a flood radiation source). The filtering of radiation that enters imaging assembly 18 substantially reduces the contribution of ambient illumination on image 59, thus increasing the signal-to-noise ratio of the triangulation process.

Figure 8:
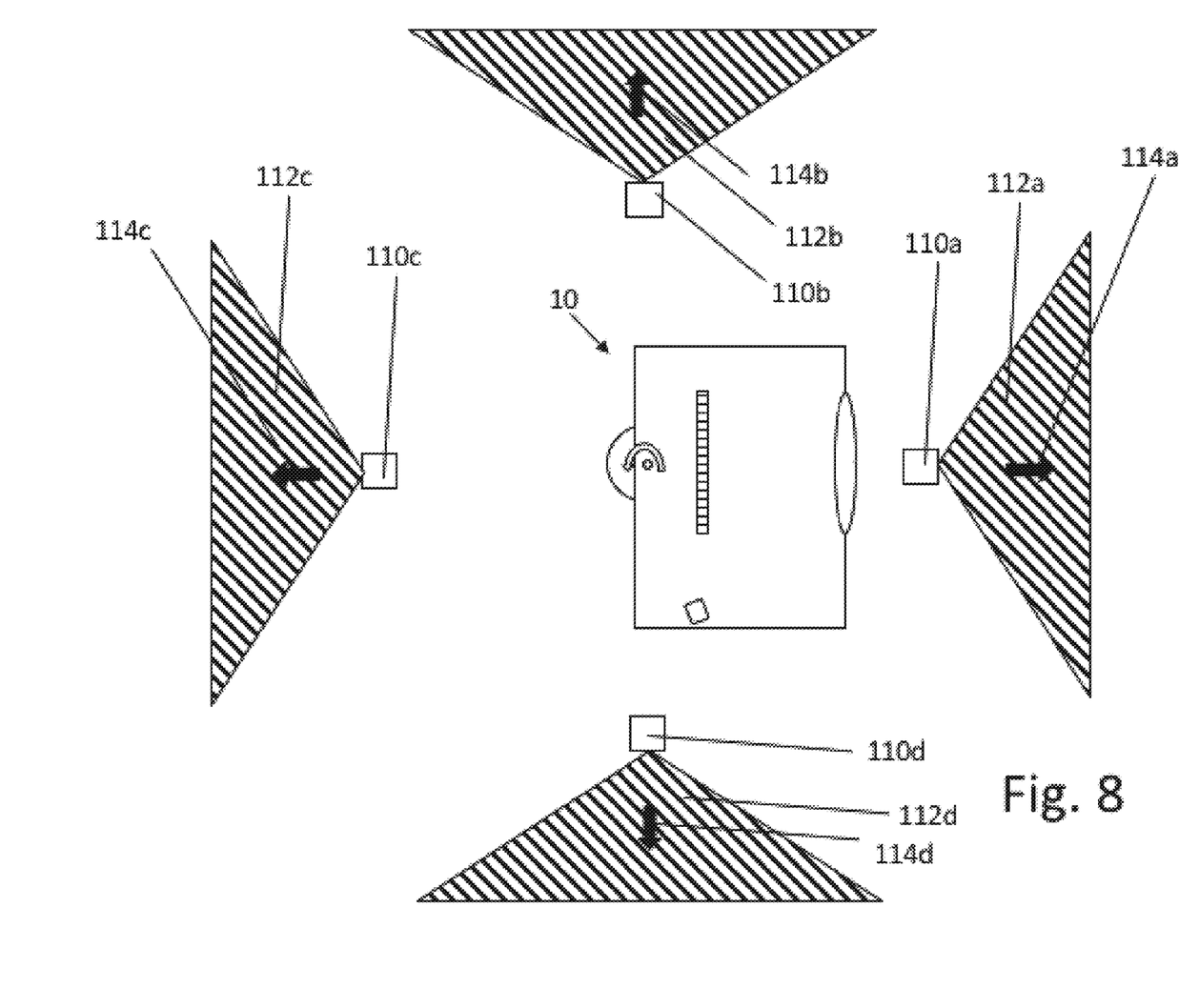
FIG. 8 is a schematic top view of a panoramic imager, in accordance with a further embodiment of the invention.

FIG. 8 is a schematic top view of panoramic imaging sensor 10 with the addition of multiple flood radiation sources 110a-d, in accordance with another embodiment of the invention. Although four flood radiation sources 110a-d are shown in FIG. 8, in other embodiments a larger or smaller number of flood radiation sources may be used. In these embodiments, the flood radiation sources may be stationary while the temporal contrast sensor is moved. For the sake of simplicity, the components of panoramic imaging sensor 10 have not been labelled in this figure.

Flood radiation sources 110a-d emit radiation into angular fields of view 112a-d, respectively, wherein the central directions of radiation are shown by arrows 114a-d, respectively. Each flood radiation source 110a-d illuminates a portion of the scene (not shown in FIG. 8) according to its angular field of view 112a-d, respectively. Angular fields of view 112a-d together illuminate an entire 360° field of view. Multiple flood radiation sources 110a-d are positioned, for instance, either above or below the plane of FIG. 8, so that they do not interfere with field of view 52 of imaging assembly 18 (referring to FIG. 2) nor with the line of radiation projected by line radiation source 16. Each of angular fields of view 112a-d exceeds 90° in order to achieve a full 360° coverage, although these angular fields may vary in embodiments with different numbers of flood radiation sources.

Processor 20 (FIG. 1) energizes flood radiation sources 110a-d in synchronization with the rotation of panoramic imager 10 about axis 14. Thus, processor 20 energizes flood radiation source 110a when panoramic imager 10 has rotated to an angular range where its field of view 52 falls within the portion of the scene illuminated by angular field of view 112a. When panoramic imager 10 has further rotated to an angular range where field of view 52 falls within with the portion of the scene illuminated by angular field of view 112b, processor 20 de-energizes flood radiation source 110a and energizes flood radiation source 110b. Similarly, flood radiation sources 110c and 110d are energized in turn while panoramic imager 10 rotates, while the other sources are de-energized. After a full rotation of 360°, flood radiation source 110a is again energized.

In some instances two flood radiation sources are energized simultaneously. For example (depending on the time required to energize a radiation source relative to the rotation speed of the imager), flood radiation source 110b may be energized while panoramic imager 10 is still imaging the region illuminated by radiation source 110a in anticipation of the panoramic imager reaching the next region.

In an alternative embodiment, all flood radiation sources 110a-d are continuously energized.

As in the embodiment of FIG. 7, line radiation source 16 and flood radiation sources 110a-d may emit radiation in the same wavelength range, and a narrow-band transmission filter that passes this wavelength range may be positioned adjacent to objective optics 26.

Although four flood radiation sources are shown in FIG. 8, alternative embodiments may comprise other numbers of flood radiation sources, both larger and smaller than four.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optoelectronic device, comprising:
   a mount, which is configured to rotate about a rotational axis;
   a line radiation source, which is attached to the mount and configured to project a line of radiation onto a scene surrounding the mount as the mount rotates;
   an imaging assembly, which is attached to the mount in a location that is offset from the line radiation source and comprises:
      a temporal contrast sensor comprising a two-dimensional array of sensing elements, which independently and asynchronously generate event signals in response to temporal changes of irradiance; and
      objective optics, which are configured to image the scene onto the array; and a processor, which is configured to process the event signals generated by the temporal contrast sensor in response to the line of radiation reflected from the scene as the mount rotates so as to construct a three-dimensional map of the scene using triangulation based on the offset between the line radiation source and the imaging assembly and simultaneously to process the event signals generated by the temporal contrast sensor in response to the rotation of the mount so as to construct a two-dimensional image of the scene.

2. The optoelectronic device according to claim 1, wherein the line radiation source is temporally modulated at a predetermined frequency, and the processor is configured to extract the event signals that are synchronized with the predetermined frequency, and to construct the three-dimensional map based on the synchronized event signals.

3. The optoelectronic device according to claim 1, wherein the three-dimensional map of the scene is registered with the two-dimensional image of the scene using the event signals generated by the temporal contrast sensor in response to the line of radiation reflected from the scene together with the event signals generated by the temporal contrast sensor in response to the rotation of the mount.

4. The optoelectronic device according to claim 1, and comprising a flood radiation source, which is configured to illuminate at least a part of the scene that is in a field of view of the imaging assembly as the mount rotates.

5. The optoelectronic device according to claim 4, wherein the line and flood radiation sources are configured to emit radiation at a predetermined wavelength, and wherein the imaging assembly comprises a spectral bandpass filter configured to pass the radiation at the predetermined wavelength into the imaging assembly.

6. The optoelectronic device according to claim 4, wherein the flood radiation source is attached to rotate with the mount.

7. The optoelectronic device according to claim 4, wherein the flood radiation source comprises at least one spatially fixed radiation source, which is configured to illuminate a portion of the scene when the field of view of the imaging assembly coincides with the portion of the scene illuminated by the at least one spatially fixed radiation source.

8. The optoelectronic device according to claim 1, wherein the projected line of radiation is parallel to the rotational axis.

9. A method for three-dimensional mapping, comprising:
rotating a line radiation source about a rotational axis while projecting a line of radiation from the line radiation source onto a scene surrounding the rotational axis;
imaging the scene onto a temporal contrast sensor, comprising a two-dimensional array of sensing elements, which independently and asynchronously generate event signals in response to temporal changes of irradiance, while rotating the temporal contrast sensor about the rotational axis in with the temporal contrast sensor offset from the line radiation source;
processing the event signals generated by the rotating temporal contrast sensor in response to the line of radiation reflected from the scene so as to construct a three-dimensional map of the scene using triangulation based on the offset between the line radiation source and the temporal contrast sensor; and
simultaneously processing the event signals generated by the rotating temporal contrast sensor so as to construct a two-dimensional image of the scene.

10. The method according to claim 9, wherein projecting the line of radiation comprises temporally modulating the radiation at a predetermined modulation frequency, and wherein processing the event signals comprises extracting the event signals using synchronous detection at the predetermined modulation frequency, and constructing the three-dimensional map based on the extracted event signals.

11. The method according to claim 9 wherein the three-dimensional map of the scene is registered with the two-dimensional image of the scene using the event signals generated by the temporal contrast sensor in response to the line of radiation reflected from the scene together with the event signals generated rotation of the temporal contrast sensor.

12. The method according to claim 9, and comprising illuminating at least a part of the scene that is in a field of view of the rotating temporal contrast sensor with flood radiation emitted by a flood radiation source.

13. The method according to claim 12, wherein illuminating at least the part of the scene comprises rotating the flood radiation source together with the temporal contrast sensor.

14. The method according to claim 12, wherein the flood radiation source comprises at least one spatially fixed radiation source, and wherein illuminating at least the part of the scene comprises energizing the at least one spatially fixed radiation source when the field of view of the rotating the temporal contrast sensor coincides with the part of the scene that is illuminated by the spatially fixed radiation source.

15. The method according to claim 9, wherein the projected line of radiation is parallel to the rotational axis.

\* \* \* \* \*